United States Patent [19]

Welch

[11] 4,339,111
[45] Jul. 13, 1982

[54] CLEAN IN PLACE DIAPHRAGM VALVE

[75] Inventor: Elmer S. Welch, Silver Lake, Wis.

[73] Assignee: Superior Stainless, Inc., Delavan, Wis.

[21] Appl. No.: 149,328

[22] Filed: May 13, 1980

[51] Int. Cl.$^3$ .............................................. F16K 7/16
[52] U.S. Cl. .................................... 251/331; 251/367; 137/238
[58] Field of Search ................ 251/331, 367; 137/240, 137/238

[56] References Cited

U.S. PATENT DOCUMENTS

| | | | |
|---|---|---|---|
| 2,875,977 | 3/1959 | Stone et al. | 251/331 |
| 3,067,764 | 12/1962 | Geary | 251/331 X |
| 3,083,943 | 4/1963 | Stewart, Jr. et al. | 251/331 X |
| 3,257,697 | 6/1966 | Boteler | 251/331 |
| 3,545,722 | 12/1970 | Bovio et al. | 251/331 |
| 3,740,019 | 6/1973 | Kessell et al. | 251/331 X |
| 4,014,514 | 3/1977 | Priese et al. | 251/331 |
| 4,022,512 | 5/1977 | Autelli | 137/240 X |
| 4,180,239 | 12/1979 | Valukis | 251/331 X |

Primary Examiner—Arnold Rosenthal

Attorney, Agent, or Firm—Mason, Kolehmainen, Rathburn & Wyss

[57] ABSTRACT

A clean in place diaphragm valve is disclosed including a valve body portion having a fluid inlet and a fluid outlet in fluid communication with a valve chamber, the valve body portion including a dished interior, valve chamber surface in which the fluid outlet is disposed; an annular wall member surrounding the fluid inlet within the valve chamber, having a first diaphragm seating surface adapted to maintain the fluid inlet and the fluid outlet in fluid separation when a diaphragm is sealed against the first diaphragm seating surface to close the valve; a second diaphragm seating surface on the valve body portion surrounding the fluid inlet and the fluid outlet; a flexible diaphragm disposed over the valve chamber to define the valve chamber between an inner surface of the diaphragm and an interior surface of the valve body portion; a bonnet disposed to compress the diaphragm against the second diaphragm seating surface; a clamp for maintaining the diaphragm in sealing engagement against the second diaphragm seating surface; and a valve stem for forcing a portion of the diaphragm into sealing engagement against the first diaphragm seating surface to achieve a valve closed position.

10 Claims, 5 Drawing Figures

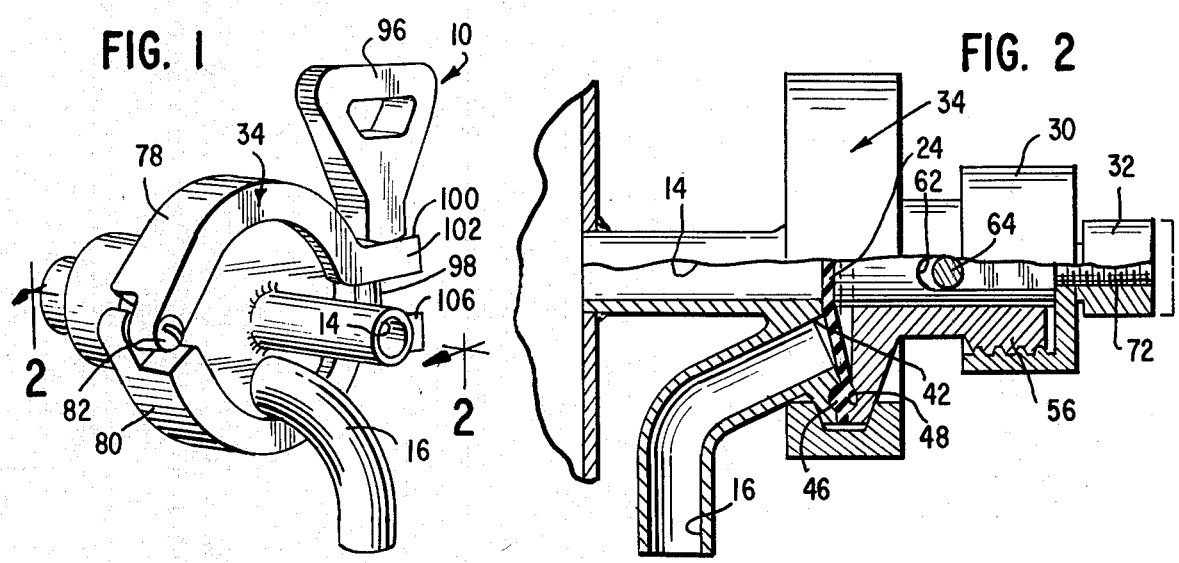
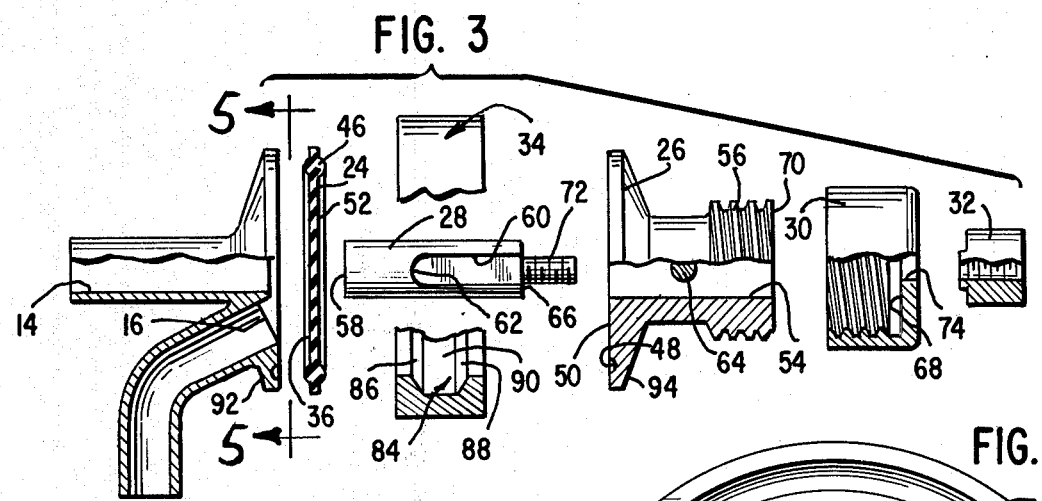
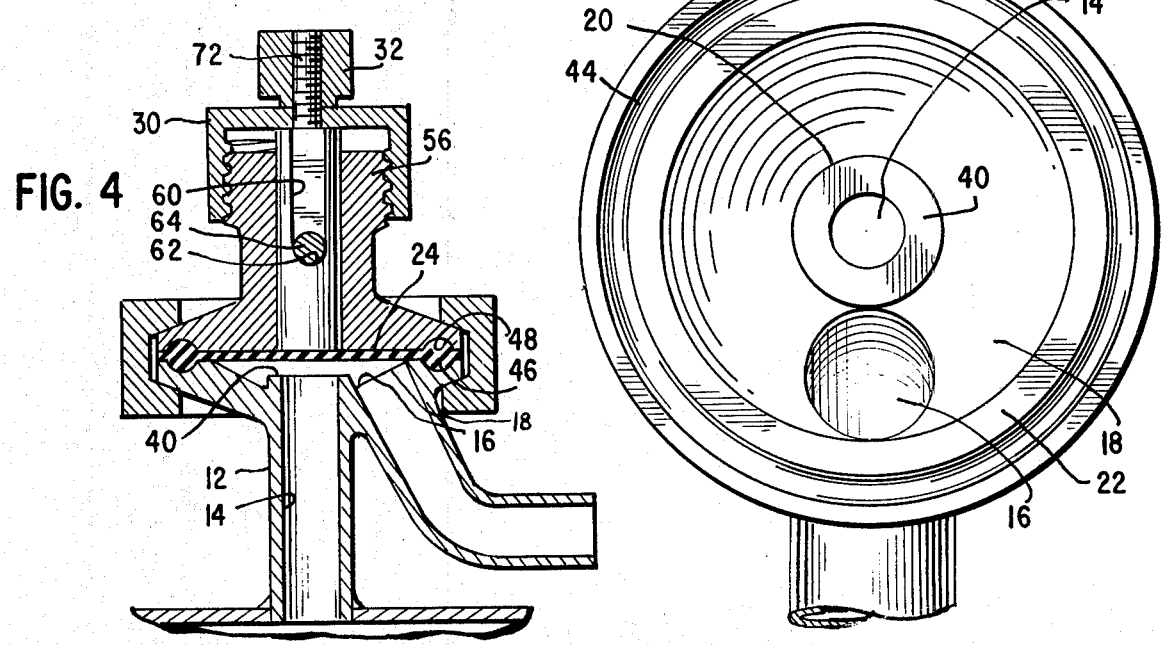

CLEAN IN PLACE DIAPHRAGM VALVE

FIELD OF THE INVENTION

The present invention relates to a diaphragm valve having the capability of being cleaned in place or being disassembled for cleaning. More particularly, the present invention relates to a diaphragm valve including a valve chamber constructed such that substantially all of a cleaning fluid is freely and completely drainable through a diaphragm valve outlet. The diaphragm valve outlet spans an entire dished surface from a central valve opening to a sealed edge of the diaphragm near its periphery so that substantially all of the cleaning fluid is freely and completely drainable.

BACKGROUND OF THE INVENTION

In many industries, such as the sanitary food industry, it is common to include a sanitary sampling valve in fluid communication with a material, such as milk, which must be completely cleaned from the valve after each sampling to prevent contamination and bacteria growth. In the past, it has been common to employ valve apparatus wherein the valve could be removed for cleaning, as by disassembly of a plurality of bolts or other fasteners so that the valve could be disassembled, cleaned, reassembled, and fastened back into place.

The diaphragm valve of the present invention eliminates the above mentioned difficulties in being constructed to that a cleaning fluid can be freely circulated throughout a valve chamber constructed such that the cleaning fluid is substantially completely and freely drainable from the valve chamber. In addition, the diaphragm valve of the present invention can be completely disassembled while the diaphragm valve housing or body remains secured in its permanent location.

SUMMARY OF THE INVENTION

In brief, the diaphragm valve of the present invention includes a valve body portion including a fluid inlet and a fluid outlet in fluid communication with a valve chamber, the valve body portion including a dished interior, valve chamber surface in which the fluid outlet is disposed; an annular wall member surrounding the fluid inlet within the valve chamber, having a first diaphragm seating surface adapted to maintain the fluid inlet and the fluid outlet in fluid separation when a diaphragm is sealed against said first diaphragm seating surface to close the valve; a second diaphragm seating surface on the valve body portion surrounding the fluid inlet and the fluid outlet; a flexible diaphragm disposed over the valve chamber to define said valve chamber between an inner surface of the diaphragm and an interior surface of the valve body portion; a bonnet dispersed to compress the diaphragm against the second diaphragm setting surface; a clamp for maintaining the diaphragm in sealing engagement against the second diaphragm seating surface; and a valve stem for forcing a portion of said diaphragm into sealing engagement against the first diaphragm seating surface to achieve a valve closed position.

Accordingly, an object of the present invention is to provide a new and improved diaphragm valve.

Another object of the present invention is to provide a new and improved diaphragm valve having the capability of being cleaned in place without disassembly by circulating a cleaning fluid through the valve chamber.

Another object of the present invention is to provide a new and improved diaphragm valve having a cleaning fluid outlet in fluid communication with a valve chamber constructed such that substantially all of the cleaning fluid will freely drain from the valve chamber through the cleaning fluid outlet while the valve remains in position.

Another object of the present invention is to provide a new and improved diaphragm valve including a valve chamber construction having a dished valve chamber surface wherein a fluid outlet from the valve chamber is disposed in the dished surface in such a manner that substantially all of a cleaning fluid entering the valve chamber will freely drain into the fluid outlet such that substantially all cleaning fluid and other contaminants will be removed from the valve chamber without the necessity for disassembling the diaphragm valve.

Another object of the present invention is to provide a new and improved diapharagm valve capable of being used both as a sampling valve and as a valve for the continuous or intermittent control of fluid flow.

Another object of the present invention is to provide a new and improved diaphragm valve wherein the diaphragm is the only moving part contacted by the fluid passing through the diaphragm valve so that the valve is easily cleanable while assembled and in place by passing a cleaning fluid through the diaphragm valve.

Another object of the present invention is to provide a new and improved diaphragm valve constructed in such a manner that by passing a cleaning fluid into the valve chamber through a fluid inlet, the cleaning fluid strikes the diaphragm and is thereby fanned outwardly, radially to assure complete contact of the cleaning fluid against every surface within the valve chamber and within the valve chamber inlet and outlet to ensure complete cleaning of the diaphragm valve.

Another object of the present invention is to provide a new and improved diaphragm valve in which the valve can be completely cleaned with a cleaning fluid and drained without the necessity of tilting or removing the valve from its operational position to achieve complete valve chamber drainage.

Another object of the present invention is to provide a new and improved diaphragm valve constructed in such a manner that the removal of a single clamp, by hand, disassembles the valve to completely expose the entire valve chamber for cleaning or polishing.

Another object of the present invention is to provide a new and improved diaphragm valve having a supplementary fluid inlet in fluid communication with the valve chamber, desirable particularly when the valve is used in periodic sampling, for the purpose of circulating an inert cleaning fluid, such as nitrogen or distilled water, through the valve chamber after valve use, while the valve remains in its permanent location, to purge the valve chamber of all contaminants before subsequent valve use.

BRIEF DESCRIPTION OF THE DRAWING

These and other objects and advantages of the present invention will be better understood by reference to the following detailed description taken in conjunction with the drawing, in which:

FIG. 1 is a perspective view of the diaphragm valve constructed in accordance with the principles of the present invention;

FIG. 2 is an enlarged partially broken-away, partially elevational, cross-sectional view of the diaphragm valve of the present invention taken through the line 2—2 of FIG. 1 showing the diaphragm valve welded in position to a fluid source;

FIG. 3 is an exploded, partially broken away, partially elevated view of the diaphragm valve of the present invention showing the diaphragm valve disassembled in a horizontal orientation;

FIG. 4 is an enlarged cross-sectional view of the diaphragm valve of the present invention similar to FIG. 2, showing the diaphragm valve in a vertical orientation;

FIG. 5 is an enlarged end view of a portion of the diaphragm valve of the present invention taken through the line 5—5 of FIG. 3 showing the valve chamber including the fluid inlet and the fluid outlet.

DETAILED DESCRIPTION OF THE PREFERRED EMBODIMENT

Referring now to the drawing, there is illustrated a new and improved diaphragm valve constructed in accordance with the principles of the present invention generally designated by reference numeral 10. The diaphragm valve 10 generally includes a valve body portion 12 having a centrally disposed fluid inlet 14 and a fluid outlet 16; an interior concave dished surface 18 disposed between an upstanding fluid inlet wall 20 and an annular diaphragm sealing surface 22; a diaphragm 24; a bonnet or second valve body portion 26; a valve stem or plunger 28; a valve handle 30; a valve handle positioning locking nut 32; and a U-shaped valve clamp 34.

In accordance with an important feature of the present invention, the diaphragm valve is constructed having a centrally disposed fluid inlet 14 in valve body portion 12 so that a cleaning fluid conveyed into the diaphragm valve 10 through the fluid inlet 14 will strike against the diaphragm 24 along an interior diaphragm wall 36 to spread the cleaning fluid radially outwardly in a fanning action to contact all surfaces of a valve chamber 37. In this manner, the cleaning fluid contacts the upstanding fluid inlet wall 20, the entire dished surface 18, and the interior diaphragm wall 36 to completely clean all surfaces which contact fluid during valve use. The valve chamber 37 is defined as the entire volume disposed between the interior diaphragm wall 36 and the interior surface of the valve body portion 12 including dished surface 18 and upstanding wall 20.

In accordance with another important feature of the present invention, the valve body portion 12 includes an annular diaphragm seating surface 22 surrounding both the fluid inlet 14 and the fluid outlet 16 so that when the diaphragm valve 10 is operatively assembled, the diaphragm 24 is sealingly engaged against the diaphragm seating surface 22 to prevent leakage of fluid out of the diaphragm valve 10. This annular seating surface 22 is disposed in a plane above the upstanding fluid inlet wall 20 and above the fluid outlet 16 so that when the diaphragm valve is in an open position, fluid can freely pass from the fluid inlet 14 through the fluid outlet 16 to provide a controlled flow of fluid through the diaphragm valve 10 or for periodic sampling of material. The fluid outlet is disposed below the fluid inlet 14 within dished surface 18 so that any fluid within the valve chamber 37 can freely and completely drain through fluid outlet 16 even when the valve 10 is in a valve closed position.

The fluid inlet 14 proceeds into the interior of the valve chamber 37 through the annular upstanding fluid inlet wall 20. The fluid inlet wall 20 ends at an annular, flat diaphragm seating surface 40 surrounding the fluid inlet 14. To close the diaphragm valve 10, the interior diaphragm wall 36 is forced against the diaphragm seating surface 40 by valve stem 28 to prevent further fluid from passing through the fluid inlet 14 to the valve chamber 37.

In accordance with an important feature of the present invention, the dished valve chamber surface 18 within valve body portion 12 is a concavely tapered surface extending completely between the annular diaphragm seating surface 22 and a base or lowermost portion of upstanding fluid inlet wall 20. The dished surface 18, therefore, permits fluid within the valve chamber 37 to be freely and completely drained from the valve chamber 37 whether the diaphragm valve 10 is positioned horizontally, as shown in FIG. 2, or positioned vertically, as shown in FIG. 4. Because of this particular construction of the valve chamber 37, a portion of the fluid outlet 16 in dished surface 18 always is positioned at the lowest point within the valve chamber 37 whether the valve is horizontal (FIG. 2), vertical (FIG. 4) or in any position therebetween to permit complete drainage.

The valve body portion 12 includes an annular groove 44 surrounding the outer annular diaphragm seating surface 22 to accept a correspondingly shaped annular rib 46 in the diaphragm 24 for convenience in properly reassembling the diaphragm valve 10 after disassembly, so that the diaphragm 24 easily is properly positioned, and to aid in effectively sealing the diaphragm 24 against the diaphragm seating surface 22. The bonnet or second valve body portion 26 similarly has an annular groove 48 on its interior surface to accept the diaphragm rib 46 to achieve effective sealing of the diaphragm 24 against the diaphragm seating surface 22 of valve body portion 12 when the diaphragm valve 10 is operationally assembled by sandwiching the diaphragm 24 between the valve body portion 12 and the bonnet 26, as shown in FIGS. 2 and 4.

The bonnet or second valve body portion 26 includes a flat interior surface 50 for contact against a bonnet facing wall 52 of diaphragm 24. The bonnet 26 includes a centrally disposed, interior annular aperture 54 extending completely through the bonnet 26 for receiving the manually removable valve stem 28 and includes an exterior threaded portion 56 adapted to threadedly receive the valve handle 30.

The valve stem or plunger 28 includes a diaphragm contacting flat end surface 58 for contact against the bonnet facing wall 52 of diaphragm 24 to force the valve chamber facing wall 36 of diaphragm 24 against the annular diaphragm seating surface 40 surrounding the fluid inlet 14 to close the diaphragm valve 10. The valve stem 28 also includes a notch 60 machined from one end of the valve stem 28 to provide an end surface 62 of the notch 60 forming a stop in the valve stem 28. The stop 62 cooperates with an annular post 64 integrally formed within, or otherwise fastened within, the annular aperture 54 of bonnet 26 to position the valve stem 28 within the aperture 54 so that when the post 64 is in contact with the stop 62, the end surface 58 of valve stem 28 is flush with the flat interior surface 50 of bonnet 26. A second end of the valve stem 28 forms a valve handle contacting surface 66 which contacts an interior rear surface 68 of the valve handle 30 so that when the valve handle 30 is longitudinally threaded onto the threaded portion 56 of bonnet 26, the valve stem 28 is forced longitudinally inwardly against the diaphragm 24 to force the diaphragm 24 into sealing engagement with the diaphragm seating surface 40 surrounding the fluid inlet 14, as shown in FIG. 2. The valve stem 28 has sufficient length so that with stop 62 in contact against the post 64, the rearward end 66 of the valve stem 28 extends beyond an end surface 70 of bonnet 26 a sufficient length that the valve handle 30 can be threaded onto the bonnet 26 a distance sufficient to force the diaphragm 24 into sealing engagement against the diaphragm seating surface 40 surrounding the fluid inlet 14.

It is understood that alternate means can be provided for forcing the diaphragm 24 into sealing engagement against the diaphragm seating surface 40 surrounding the fluid inlet. For example, valve stem 28 can be longitudinally actuated hydraulically, such as with air pressure, or electrically, as well known in the valve art.

The valve stem 28 further includes a threaded, coaxial post 72 extending rearwardly from the rearward end surface 66 of valve stem 28 for threadedly receiving the threaded locking nut 32 to lock the valve handle 30 in a predetermined, desired position on the bonnet 26. The threaded post 72 is received within an annular aperture 74 in the rear wall 68 of the valve handle 30, as shown in FIGS. 2 and 4, so that the locking nut 32 can be threaded onto the post 72 to secure the locking nut 32 against the rear wall 68 of valve handle 30 thereby securing the valve handle 30 and valve stem 28 in the predetermined, desired position.

The valve body clamp 34 is positioned to sandwich the diaphragm 24 between the valve body portion 12 and the bonnet 26 to seal the diaphragm 24 against the annular diaphragm seating surface 22. The valve body clamp 34 includes two correspondingly shaped leg members 78 and 80 (FIG. 1) attached with a pin 82 to form a rotating or hinged connection about pin 82. Each leg member 78 and 80 includes an interior tapered channel 84 including inwardly converging wall members 86 and 88 and a channel base 90 to compressingly sandwich the diaphragm 24 between the interior diaphragm seating surface 22 of the valve body 12 and the interior surface 50 of the bonnet 26 for effective sealing of the diaphragm 24 therebetween. The tapered wall members 86 and 88, respectively, contact correspondingly shaped, outwardly converging end portions 92 and 94 of the valve body portion 12 and the bonnet 26 to squeeze the valve body 12 and bonnet 26 toward each other against the diaphragm 24 for effective sealing.

The valve body clamp 34 includes a clamp handle 96 including an interior threaded aperture (not shown) for receiving a threaded post 98 to secure the valve body clamp 34 in position surrounding the valve body portion 12 and bonnet 26 to seal the diaphragm 24 in position. The threaded post 98 is hingedly secured to leg member 80 so that the clamp handle 96 can be turned to loosen the leg members 78 and 80 so the handle 96 and post 98 can be roated to remove the clamp handle 96 from contact against leg member 78 to disassemble the diaphragm valve 10. The clamp handle 96 secures the leg members 78 and 80 in position around the valve body portion 12 and the bonnet 26 by tightening the valve handle 96 against a flat upper surface 100 of a straightened leg member portion 102. The leg member portion 102 includes a central aperture (not shown) extending completely to an end 104 of straightened leg portion 102 to receive the threaded post 98 when securing the valve body clamp 34 in position.

In accordance with an important feature of the present invention the upper flat surface 100 of straight leg member portion 102 diverges outwardly away from a straightened leg member portion 106 of leg member 80 to prevent the clamp handle from slipping off of leg member portion 102 when the valve body clamp 34 is tightened around valve body portion 12 and bonnet 26.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A diaphragm valve comprising;
    a valve body portion including a fluid inlet and a fluid outlet in fluid communication with a valve chamber, said fluid inlet being centrally disposed within said valve body portion and said fluid outlet being radially spaced from said fluid inlet within said valve body portion;
    wall means surrounding said fluid inlet within said valve chamber, including a first diaphragm seating surface adapted to maintain said fluid inlet and said fluid outlet in fluid separation when a diaphragm is sealed against said first diaphragm seating surface to close the valve;
    a second diaphragm seating surface on said valve body portion surrounding said fluid inlet and said fluid outlet to prevent passage of fluid into or out of said valve except through said fluid inlet or fluid outlet when said valve is operatively assembled to seal said diaphragm against said second diaphragm seating surface;
    a flexible diaphragm disposed over said valve chamber to define said valve chamber between an inner surface of said diaphragm and an interior surface of said valve body portion;
    a bonnet disposed to compresss said diaphragm against said second diaphragm seating surface, including means for maintaining said diaphragm in sealing engagement against said second diaphragm seating surface surrounding said fluid inlet and fluid outlet, said bonnet including an aperture for receiving a valve stem, said bonnet aperture including a transverse stop member extending into said aperture for contact against a valve stem stop surface;
    a valve stem axially disposed with respect to said fluid inlet, said valve stem including a longitudinal groove extending from one longitudinal end thereof over a portion of the valve stem length to form a stop wall in said valve stem for contact against said stop member when said valve stem is axially adjusted to sealingly engage said diaphragm against said first diaphragm seating surface to achieve a valve closed position;
    said valve body portion including a dished interior valve chamber surface in which said fluid outlet is disposed, said dished surface tapered inwardly toward said wall means, said fluid outlet being disposed in said dished surface to completely span said dished surface between said second diaphragm seating surface and a base of said wall means; and
    a U-shaped clamp adapted to compressingly engage an exterior surface of said valve body portion and an exterior surface of said bonnet to compress said valve body portion and said bonnet toward each other against said diaphragm to sealingly engage said diaphragm against said second diaphragm seating surface.

2. A diaphragm valve as defined in claim 1 wherein said clamp comprises two curved leg members hingedly connected to form said U-shape, each of said leg members including a U-shaped interior, tapered channel adapted to contact said valve body portion and said bonnet when said valve is operatively assembled.

3. A diaphragm valve as defined in claim 2 wherein said clamp further includes means for compressing said leg members toward each other when said leg members are properly positioned in contact with said valve body portion and said bonnet to compress said valve body portion and said bonnet in sealing engagement against said diaphragm.

4. A diaphragm valve as defined in claim 2 wherein said valve body portion and said bonnet each include an exterior surface portion adapted to fit within said channel when said valve is operatively assembled.

5. A diaphragm valve as defined in claim 1 wherein removal of said U-shaped clamp disassembles said valve body portion, said diaphragm and said bonnet to expose said valve chamber.

6. A diaphragm valve as defined in claim 1 further including a valve handle threadedly connected to said bonnet and operatively connected to a valve stem such that turning said valve handle causes said valve stem to move longitudinally toward said diaphragm to seal said diaphragm against said first diaphragm seating surface.

7. A diaphragm valve as defined in claim 6 further including means for locking said valve handle in a desired position on said bonnet.

8. A diaphragm valve as defined in claim 1 wherein said stop member cooperates with a stop wall defined by an end of said groove so that when the bonnet stop member is in contact with said stop wall of the valve stem, an end surface of the valve stem is adjacent to the diaphragm and lies in substantially the same plane as a diaphragm contacting bonnet surface.

9. A diaphragm valve as defined in claim 1 further including a valve handle adjustably and coaxially connected to said bonnet, said valve handle including an interior valve stem contacting surface so that downward longitudinal adjustment of said valve handle causes downward longitudinal movement of said valve stem to force said diaphragm into sealing engagement against said first diaphragm seating surface.

10. A diaphragm valve as defined in claim 9 wherein said valve stem includes an axial, elongated member extending upwardly through said valve handle and further including a locking means for attachment to said elongated member to lock said valve stem to said valve handle at a desired longitudinal position.

* * * * *